(12) United States Patent  (10) Patent No.: US 7,616,387 B2
Kokabu  (45) Date of Patent: Nov. 10, 2009

(54) MOTOR DRIVE CONTROLLER FOR CONTROLLING MOVEMENT AND STOP BY MOTOR AND CAMERA APPARATUS

(75) Inventor: Daisuke Kokabu, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 428 days.

(21) Appl. No.: 11/447,641

(22) Filed: Jun. 6, 2006

(65) Prior Publication Data
US 2008/0165431 A1  Jul. 10, 2008

(30) Foreign Application Priority Data
Jun. 17, 2005  (JP) .............................. 2005-177425

(51) Int. Cl.
G02B 15/14  (2006.01)
G02B 7/02  (2006.01)
G03B 13/34  (2006.01)
(52) U.S. Cl. ..................... 359/697; 359/824; 396/131
(58) Field of Classification Search .......... 359/694–701, 359/619–624, 819–824; 396/79, 130–136
See application file for complete search history.

(56) References Cited

U.S. PATENT DOCUMENTS 5,448,328 A * 9/1995 Suzuki et al. ............... 396/133
5,918,078 A * 6/1999 Imura et al. ................ 396/137
6,301,441 B1 * 10/2001 Kato ......................... 396/131
7,003,222 B1 2/2006 Murakami

FOREIGN PATENT DOCUMENTS

JP  5-257060 A  10/1993
JP  2004-085840 A  3/2004
JP  2004-317997 A  11/2004

* cited by examiner

Primary Examiner—Mohammed Hasan
(74) Attorney, Agent, or Firm—Frishauf, Holtz, Goodman & Chick, P.C.

(57) ABSTRACT

A control section acquires a stop target position where a stop target lens should be stopped from a zoom tracing table according to zoom operation. Next, a motor driver is controlled to drive a DC motor of a lens unit. Comparison is made between a current state and a target deceleration curve. When the stop target lens reaches a deceleration start position, deceleration is made along the target deceleration curve by increasing or decreasing an ON ratio of PWM drive and a voltage applied according to deviance from the target deceleration curve. When the stop target lens reaches a complete stop processing start position, the motor driver is controlled to stop the stop target lens at the stop target position. Thereby, a zoom lens and a focus lens can be moved more precisely and speedily to the target position.

10 Claims, 10 Drawing Sheets

FIG.3

| ZOOM POSITION | WIDE | WIDE-1 | ⇑ | ⇑ | ⇑ | ⇑ | TELE-1 | TELE |
|---|---|---|---|---|---|---|---|---|
| ZOOM STOP POSITION PULSE NUMBER [pls] | A | B | ⇑ | ⇑ | ⇑ | ⇑ | C | D |
| FOCAL LENGTH [mm] | E | F | ⇑ | ⇑ | ⇑ | ⇑ | G | H |
| F VALUE [F_No] | I | J | ⇑ | ⇑ | ⇑ | ⇑ | K | L |
| INFINITELY REMOTE FOCUS ADDRESS [pls] | M | N | ⇑ | ⇑ | ⇑ | ⇑ | O | P |
| OBJECT DISTANCE | ⇨ ⇨ ⇨ | ⇨ ⇨ ⇨ | ⇨ ⇨ ⇨ | ⇨ ⇨ ⇨ | ⇨ ⇨ ⇨ | ⇨ ⇨ ⇨ | ⇨ ⇨ ⇨ | ⇨ ⇨ ⇨ |
| | ⇩ | ⇩ | ⇩ | ⇩ | ⇩ | ⇩ | ⇩ | ⇩ |
| MOST PROXIMAL END FOCUS ADDRESS [pls] | Q | R | ⇑ | ⇑ | ⇑ | ⇑ | S | T |

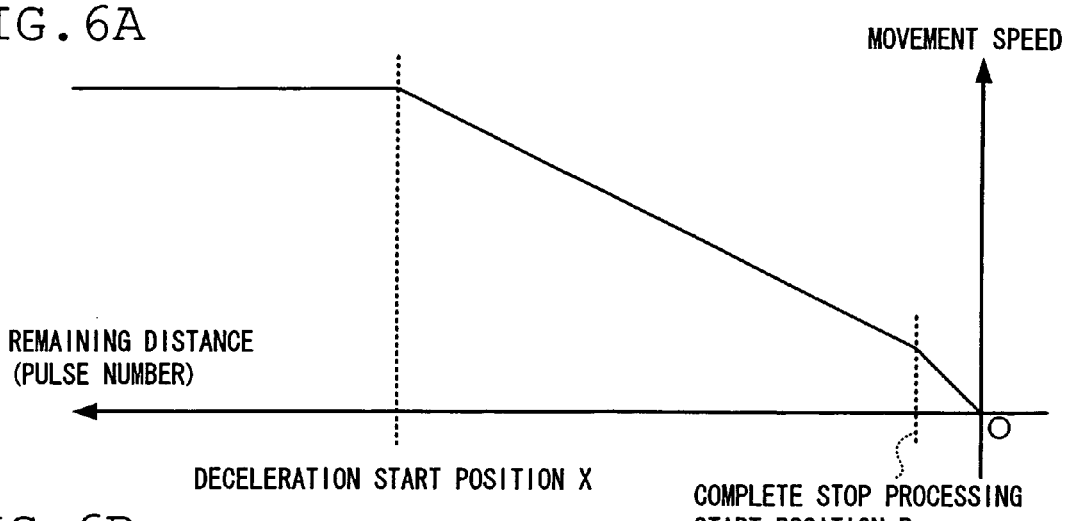
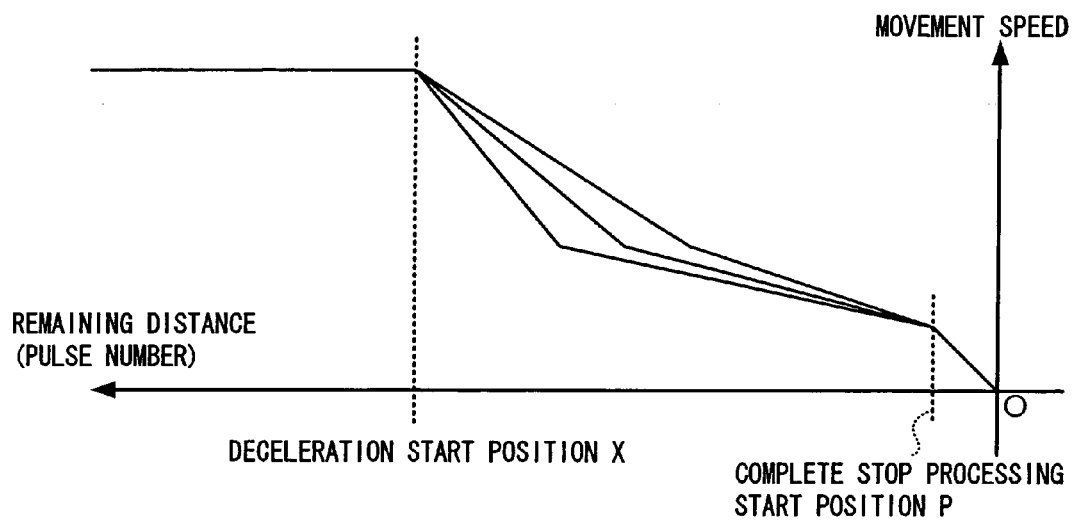
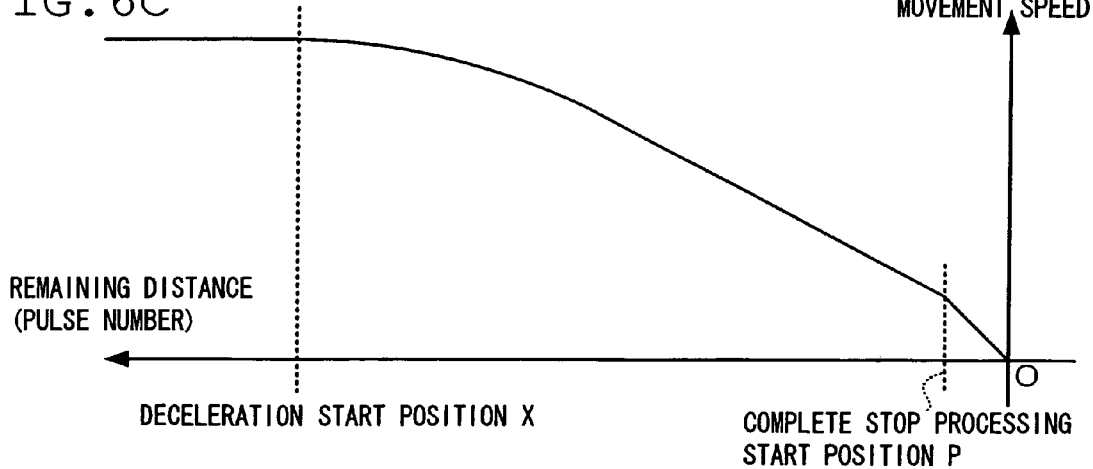

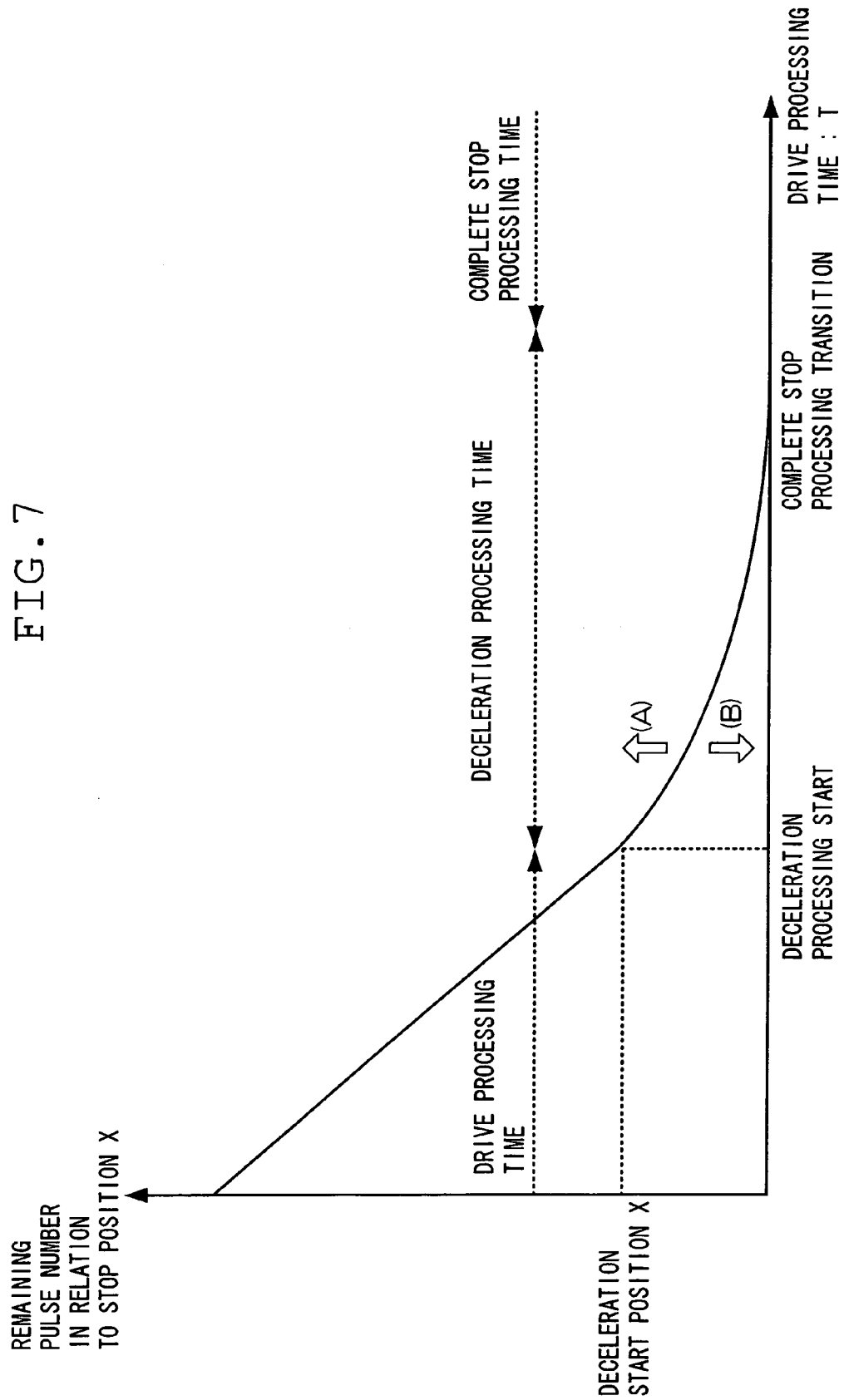

FIG.8

| | | |
|---|---|---|
| BASIC SETTING | REMAINING PULSE NUMBER IN RELATION TO STOP POSITION X = | ZOOM STOP POSITION PULSE NUMBER − CURRENT POSITION PULSE |
| | DECELERATION PROCESSING ELAPSED TIME T = | CURRENT TIME − DECELERATION PROCESSING START TIME |
| | INTERMITTENT STOP PROCESSING TIME WHEN STARTING DECELERATION : | INTERMITTENT DRIVE PROCESSING TIME WHEN STARTING DECELERATION = 1 : 9 |
| | INTERMITTENT DRIVE VOLTAGE WHEN STARTING DECELERATION = | DRIVE VOLTAGE × 90% |
| WHEN X-T RELATION IS AS INDICATED BY DECELERATION CURVE | NEXT SETTING INTERMITTENT STOP PROCESSING TIME = | PREVIOUS SETTING INTERMITTENT STOP PROCESSING TIME × 110% |
| | NEXT SETTING INTERMITTENT DRIVE PROCESSING TIME = | PREVIOUS SETTING INTERMITTENT DRIVE PROCESSING TIME × 90% |
| | NEXT SETTING DRIVE VOLTAGE = | PREVIOUS SETTING DRIVE VOLTAGE × 90% |
| WHEN X-T RELATION IS IN THE DIRECTION OF A | NEXT SETTING INTERMITTENT STOP PROCESSING TIME = | PREVIOUS SETTING INTERMITTENT STOP PROCESSING TIME × 100% |
| | NEXT SETTING INTERMITTENT DRIVE PROCESSING TIME = | PREVIOUS SETTING INTERMITTENT DRIVE PROCESSING TIME × 110% |
| | NEXT SETTING DRIVE VOLTAGE = | PREVIOUS SETTING DRIVE VOLTAGE × 110% |
| WHEN X-T RELATION IS IN THE DIRECTION OF B | NEXT SETTING INTERMITTENT STOP PROCESSING TIME = | PREVIOUS SETTING INTERMITTENT STOP PROCESSING TIME × 110% |
| | NEXT SETTING INTERMITTENT DRIVE PROCESSING TIME = | PREVIOUS SETTING INTERMITTENT DRIVE PROCESSING TIME × 100% |
| | NEXT SETTING DRIVE VOLTAGE = | PREVIOUS SETTING DRIVE VOLTAGE × 100% |

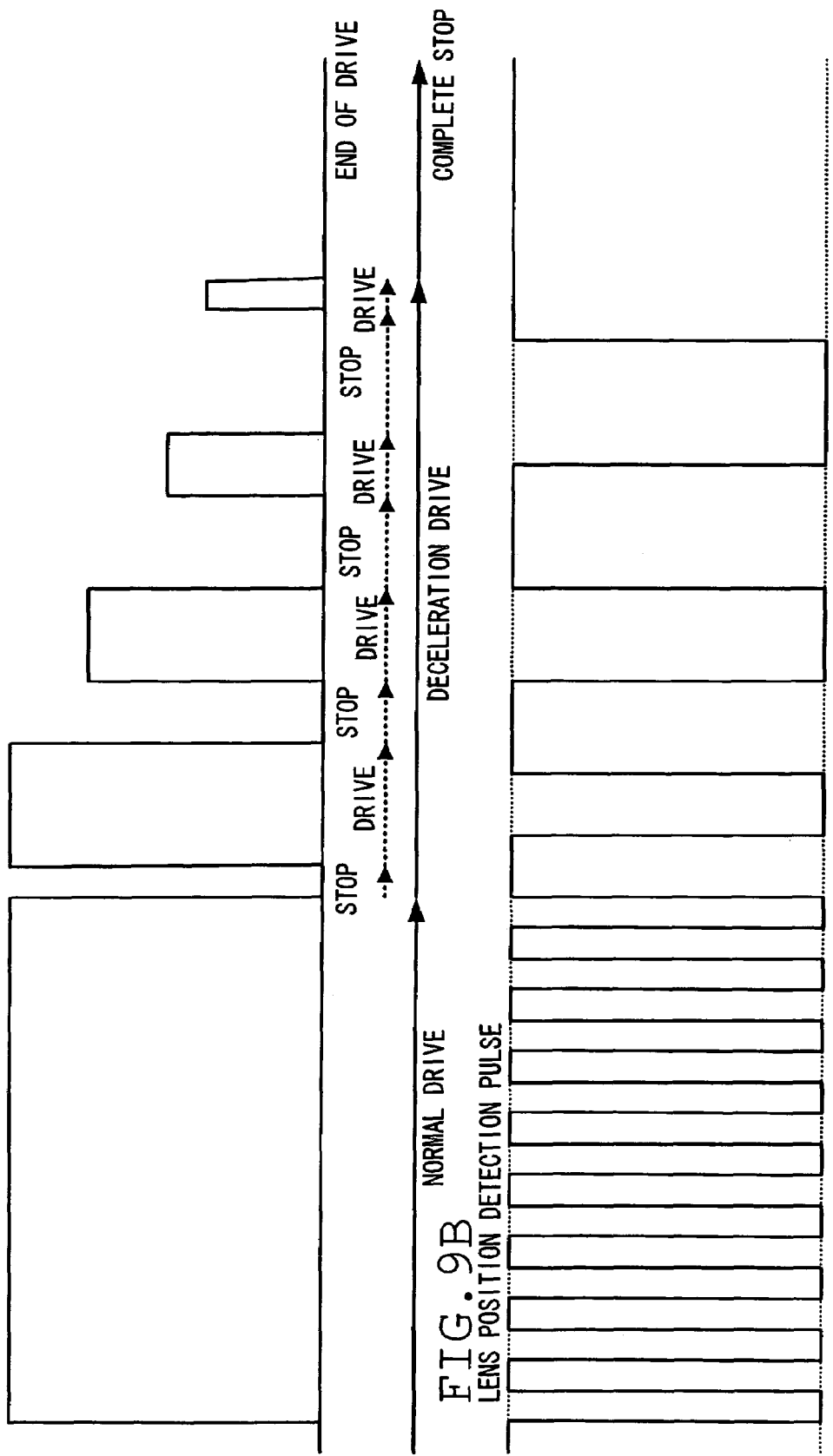

MOTOR DRIVE CONTROLLER FOR CONTROLLING MOVEMENT AND STOP BY MOTOR AND CAMERA APPARATUS

CROSS-REFERENCE TO RELATED APPLICATION

This application is based upon and claims the benefit of priority from the prior Japanese Patent Application No. 2005-177425, filed Jun. 17, 2005, the entire contents of which is incorporated herein by reference.

BACKGROUND OF THE INVENTION

1. Field of the Invention

The present invention relates to a digital camera or the like, more particularly to a movement controller for moving a zoom lens and a focus lens to a designated position at a high speed, a camera apparatus, a movement control method, and a movement control program.

2. Description of the Related Art

For the past number of years, it has often been the case that when a zoom lens or a focus lens is moved to a designated position at a high speed for camera focus adjustment or the like, DC motors are used for cost saving and downsizing instead of stepping motors. Differently from the case of processing to stop the stepping motor, when the DC motor is stopped, it is necessary to consider free running due to inertia and start stop processing when a lens is located before a desired stop position. That is, in the case that the brake is suddenly applied when the lens is moved at a high speed without previous deceleration as shown in FIG. 10A, fluctuations are caused in the stop position according to the brake effect.

For example, as shown in FIG. 10B, a technique is disclosed in which a DC motor is decelerated to a given speed when the lens approaches a first distance (deceleration start position X) in relation to a stop target position O, under this condition, such a given speed is maintained until the lens approaches a second distance (complete stop processing start position) and the brake is applied when the lens approaches the second distance to completely stop the lens (refer to Japanese Laid-Open Patent Publication Nos. H05-257060 and 2004-317997).

According to the foregoing related art, since the brake is applied after deceleration to the given speed, free running distance becomes short, and precision of the stop position can be improved. In addition, since the lens is moved at the maximum speed until deceleration to the given speed, the lens can be moved at a high speed and precisely to the designated position.

However, in the foregoing related art, how to set the given speed decelerated before the stop target position is to be set is problematic. That is, when the given speed is set high, some free running is generated even after the brake is applied. Since such a free running distance is changed according to the DC motor, fluctuations depending on each peripheral component, ambient temperatures and the like, sufficient precision is not able to be obtained. Meanwhile, when the given speed is set low, the precision becomes favorable. However, elapsed time until the lens reaches the stop target position becomes long, and therefore high speed operation is not able to be expected. Further, since acceleration is significantly changed due to deceleration, deceleration is not able to be made smoothly, and vibration and noise in deceleration become large.

SUMMARY OF THE INVENTION

In accordance with an aspect of the present invention, there is provided a camera apparatus comprising: a lens unit composed of lenses and a DC motor for moving the lenses; a motor driver for outputting a drive signal for driving the DC motor according to inputted command; and a control section for controlling contents and timing of the command outputted to the motor driver in order to move the lens to a position corresponding to a zoom magnification and a focal length, the drive signal is defined as a signal for controlling electrical power applied to a coil of the DC motor by PWM control or voltage control, the command is defined as a command for designating an ON/OFF ratio in the PWM control or a voltage applied to the coil, and the control section sequentially specifies a current position of the lens based on a position detection signal outputted from the lens unit, and controls the contents of the command outputted in each timing until the lens reaches a stop target position so that movement speed of the lens is gradually slowed as the lens approaches the stop target position.

In accordance with another aspect of the present invention, there is provided a movement controller for moving a given mechanism section to a designated stop target position by a DC motor comprising: a drive control means for driving the DC motor to move the given mechanism section in the direction of the stop target position; a deceleration control means for gradually decelerating rotational speed of the DC motor when the mechanism section in transit approaches the stop target position past a first distance; and a stop control means for completely stopping the mechanism section by braking rotation of the DC motor when the mechanism section decelerated by the deceleration control means approaches the stop target position past a second distance.

In accordance with still another aspect of the present invention, there is provided a camera apparatus for moving a lens in an imaging section in an imaging section to a designated stop target position by a DC motor comprising: a drive control means for driving the DC motor to move the lens in the direction of the stop target position; a deceleration control means for gradually decelerating rotational speed of the DC motor when the lens in transit approaches the stop target position past a first distance; and a stop control means for completely stopping the lens by braking rotation of the DC motor when the lens decelerated by the deceleration control means approaches the stop target position past a second distance.

BRIEF DESCRIPTION OF THE DRAWINGS

FIG. 3 is a conceptual diagram showing data of a zoom tracking table stored in a program memory 30 of the digital camera according to this embodiment;

FIGS. 6A to 6C are conceptual diagrams showing examples of target (ideal) deceleration curves for controlling a DC motor in this embodiment;

FIG. 7 is a conceptual diagram showing an example of a target (ideal) deceleration curve for controlling the DC motor in this embodiment;

FIG. 8 is a conceptual diagram showing an example for correcting deviance from the target (ideal) deceleration curve to control the DC motor;

FIGS. 9A and 9B are conceptual diagrams showing an example of a voltage applied of the DC motor and a position detection pulse when a control method according to this embodiment is performed.

DETAILED DESCRIPTION OF THE PREFERRED EMBODIMENT

The present invention will hereinafter be described in detail with reference to the preferred embodiment shown in the accompanying drawings.

A. Structure of the Embodiment

Figure 1:
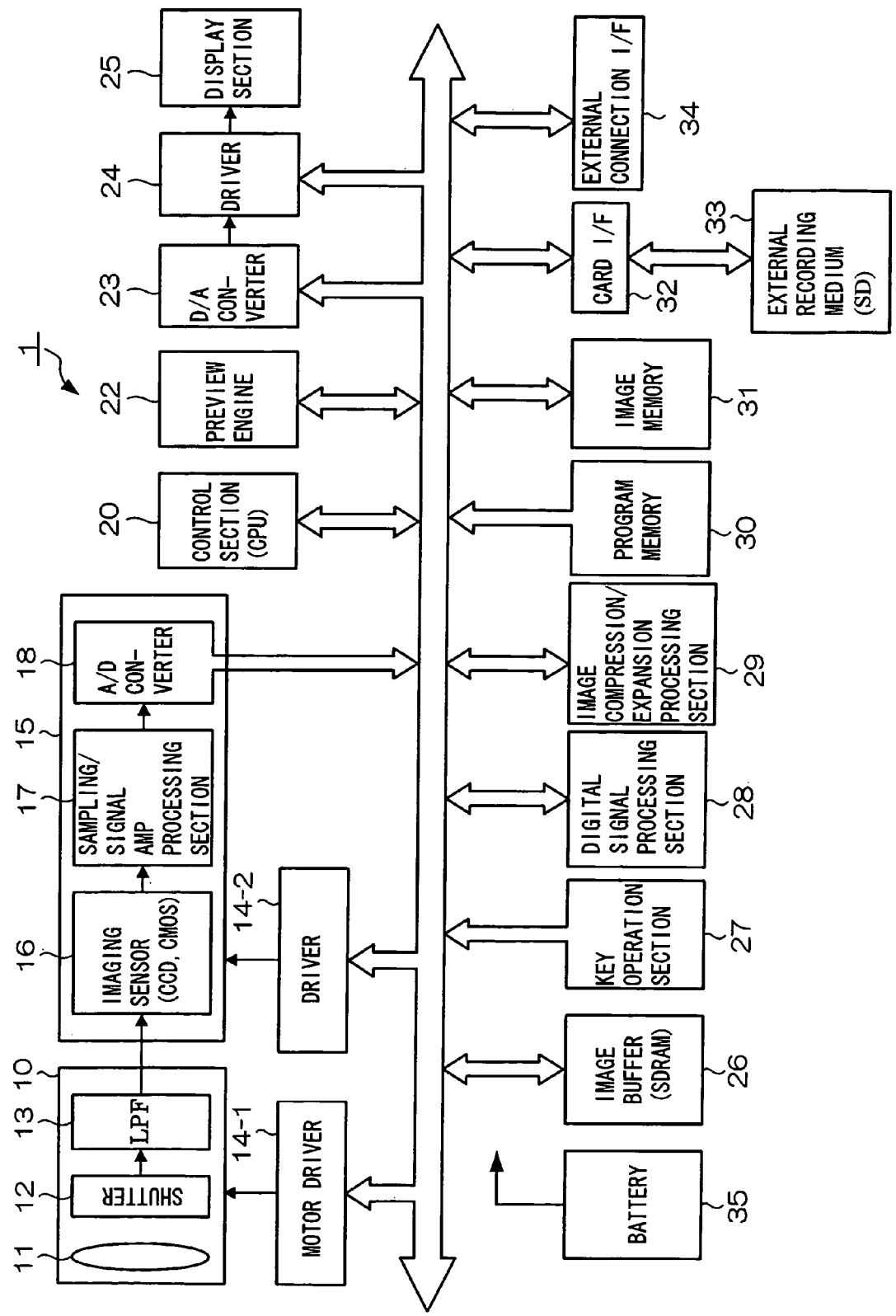
FIG. 1 is a block diagram showing a structure of a digital camera according to an embodiment of the present invention.

FIG. 1 is a block diagram showing a structure of a digital camera according to an embodiment of the present invention. In the figure, an image acquisition section 10 is composed of a lens unit 11, a shutter 12, and an LPF 13. The lens unit 11 is composed of a lens group in which aspheric lenses such as a zoom lens and a focus lens are stacked. The lens unit 11 includes a DC motor for driving the foregoing zoom lens and the foregoing focus lens. The shutter 12 is a so-called mechanical shutter, which is operated by a motor driver 14-1 driven by a control section 20 when a shutter button is operated. The LPF 13 is a crystal low pass filter which is mounted in order to prevent generation of moire. The motor driver 14-1 controls driving the DC motor of the lens unit 11 to move the zoom lens, to move the focus lens and the like according to the control command provided from the control section (CPU) 20. A driver 14-2 drives an imaging sensor 16.

Next, an analog signal processing section 15 is Composed of the imaging sensor (CCD, CMOS) 16, a sampling/signal amplification processing section 17, and an A/D converter 18. The imaging sensor 16 images an object image (image), and converts light intensity of each color of RGB to a current value. The sampling/signal amplification processing section 17 performs correlated double sampling processing for inhibiting noise and irregular color and signal amplification processing. The A/D converter 18 is also called analog front end, and converts a sampled and amplified analog signal to a digital signal (converts each color of RGB and CMYK to 12 bit data, and outputs the converted data to a bus line).

Next, the control section (CPU) 20 controls a whole digital camera 1 (imaging apparatus) according to programs stored in an after-mentioned program memory. In particular, in this embodiment, the motor driver 14-1 is controlled to drive the DC motor for driving the lens unit 11 according to zoom operation. Details of controlling the motor driver 14-1 by the control section (CPU) 20 and controlling drive of the lens unit 11 will be described later.

A preview engine 22 performs pixel skipping processing for displaying digital data inputted via the image acquisition section 10 and the analog signal processing section 15 in a telerecording mode (also referred to as recording mode or shooting mode), or digital data stored in an image buffer 26 immediately after detecting shutter operation and digital data stored in an image memory 31 on a display section 25. A D/A converter 23 converts the digital data which is pixel-skipped by the preview engine 22, and outputs the converted data to a driver 24 as a subsequent stage. The driver 24 comprises a buffer region for temporarily storing digital data to be displayed on the display section 25 as a subsequent step, and drives the display section 25 based on a control signal inputted via a key operation section 27 and the control section 20. The display section 25 is composed of a color TFT liquid crystal, an STN liquid crystal or the like, and displays a preview image, image data after shooting, a setting menu and the like.

The image buffer 26 temporarily stores digital data immediately after shooting until the digital data is inputted via the analog signal processing section 15 or a digital signal processing section 28 and transported to the digital signal processing section 28. A key operation section 27 is composed of a shutter button, a recording/reproduction mode selection slide switch, a menu button, and a cross key (determination is made when the center is depressed) and the like.

The digital signal processing section 28 performs white balance processing, color processing, gradation processing, edge enhancement, conversion from RGB format to YUV format, and conversion from YUV format to JPEG format for digital data inputted via the analog signal processing section 15. Further, the digital signal processing section 28 generates an image file in accordance with the Exif specification from image data downloaded from the image acquisition section 10 and the analog signal processing section 15. An image compression/expansion processing section 29 compresses and codes digital data inputted via the digital signal processing section 28 into JPEG format, or extends the JPEG format file in reproduction mode.

A program memory 30 stores various programs to be loaded into the control section 20, an EV value in a best shot function, color correction information and the like. In particular, in this embodiment, the program memory 30 holds a zoom tracking table 30-1 in which a stop position of the zoom lens, a focal length, an F value and a position of the focus lens, etc. in the lens unit 11 are set. Details of the zoom tracking table 30-1 will be described later.

An image memory 31 stores image data temporarily stored in the image buffer 26 and digital data converted in various file formats. A card I/F 32 controls data exchange between an external recording medium 33 and an imaging apparatus main body. The external recording medium 33 is a removable recording medium such as a CompactFlash (registered trademark), a memory stick, and an SD card. An external connection use I/F 34 is composed of a slot for USB connector or the like. The external connection use I/F 34 is connected to a personal computer or the like, and is used for transferring shot image data. A battery 35 is composed of a disposable primary battery, a rechargeable secondary battery or the like. The battery 35 supplies electrical power for driving the foregoing respective components.

Figure 2:
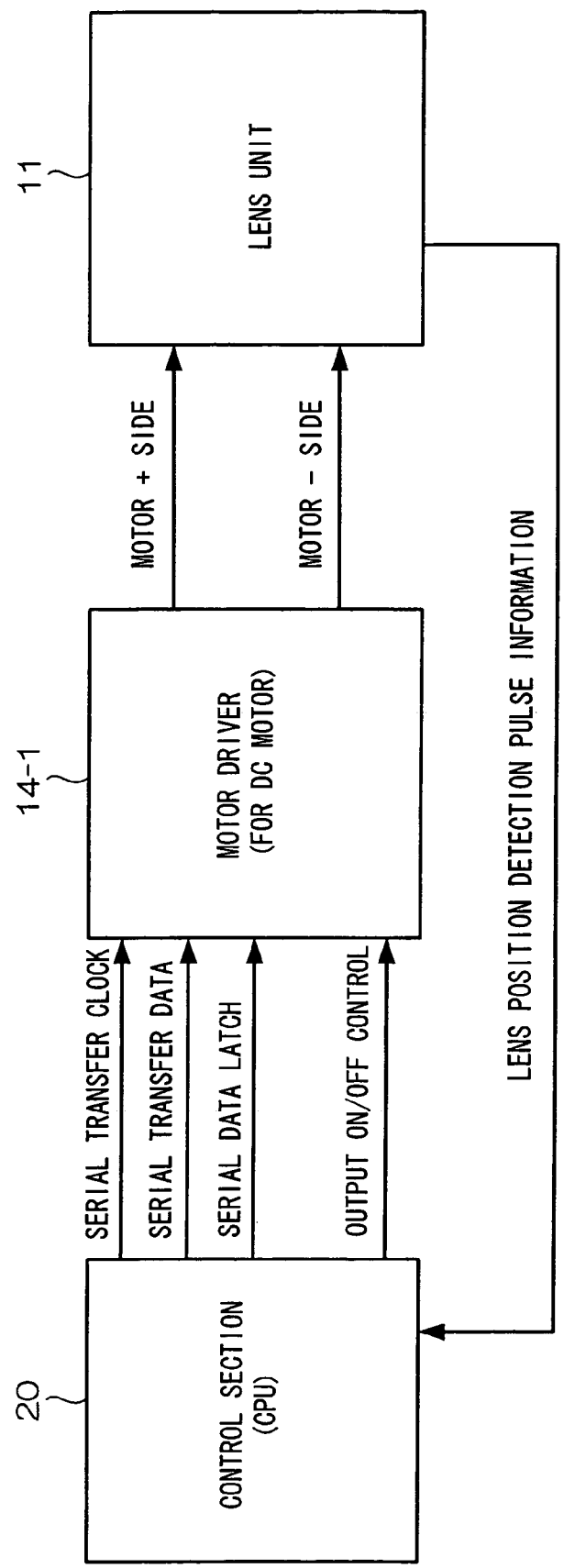
FIG. 2 is a block diagram for explaining a control system in a control section (CPU) 20, a motor driver 14-1, and a lens unit 11 in the digital camera of this embodiment.

Next, FIG. 2 is a block diagram for explaining a control system in the control section (CPU) 20, a motor driver 14-1, and a lens unit 11 in the digital camera of this embodiment. The control section (CPU) 20 controls operation of the motor driver 14-1 by sending a serial transfer clock, serial transfer data, and a serial data latch via a serial communication control line. Further, the control section (CPU) 20 controls a signal outputted from the motor driver 14-1 to the lens unit 11 in the OFF (high impedance) state by lowering an output ON/OFF control line to "L" level, for example. The control section (CPU) 20 can control operation of the motor driver 14-1 by using the foregoing output ON/OFF control line instead of the foregoing serial communication control line in performing stop processing of the DC motor in order to decrease frequent serial transfer. Further, the control section (CPU) 20 calculates a current position and speed of the lens unit (zoom lens and focus lens) 11 according to zoom position detection pulse information from an encoder included in the DC motor of the lens unit 11.

The motor driver 14-1 supplies motor+side output and motor−side output to the lens unit 11 to drive the DC motor of the lens unit (zoom lens and focus lens) 11 according to the serial transfer clock, the serial transfer data, the serial data latch, or the output ON/OFF control from the control section (CPU) 20. The lens unit 11 drives the DC motor according to the motor+side output to move the lens to the TELE side; and drives the DC motor according to the motor−side output to move the lens to the WIDE side. The DC motor of the lens unit 11 comprises the encoder as described above, and sends the zoom position detection pulse information to the control section (CPU) 20 by its rotation.

Next, FIG. 3 is a conceptual diagram showing data of the zoom tracking table 30-1 stored in the program memory 30 of the digital camera according to this embodiment. In this embodiment, zoom stop positions (pulse numbers) are previously set. That is, unique determination is possible so that when the zoom position is "WIDE," the zoom stop position is A [pulse], when the zoom position is "WIDE+1," the zoom stop position is B [pulse] . . . when the zoom position is "TELE−1," the zoom stop position is C [pulse], and when the zoom position is "TELE," the zoom stop position is D [pulse]. Further other parameters such as a focal length [mm], an F value [F_No] and a focus address [pulse] are specified for every zoom position.

The control section (CPU) 20 acquires a zoom lens stop position, that is, a stop target position O from the zoom tracking table 30-1 according to zoom operation, controls drive of the DC motor by using an after-mentioned target (ideal) deceleration curve, and moves the zoom lens to the foregoing stop target position O. Similarly, the control section (CPU) 20 acquires a stop position of a focus lens, that is, a focus address from the zoom tracking table 30-1 according to zoom operation and an object distance, controls drive of the DC motor by using the after-mentioned deceleration curve so as to set the focus address as the stop target position O in the focus lens, and moves the focus lens to the foregoing stop target position O.

B. Operation of the Embodiment

Figure 4:
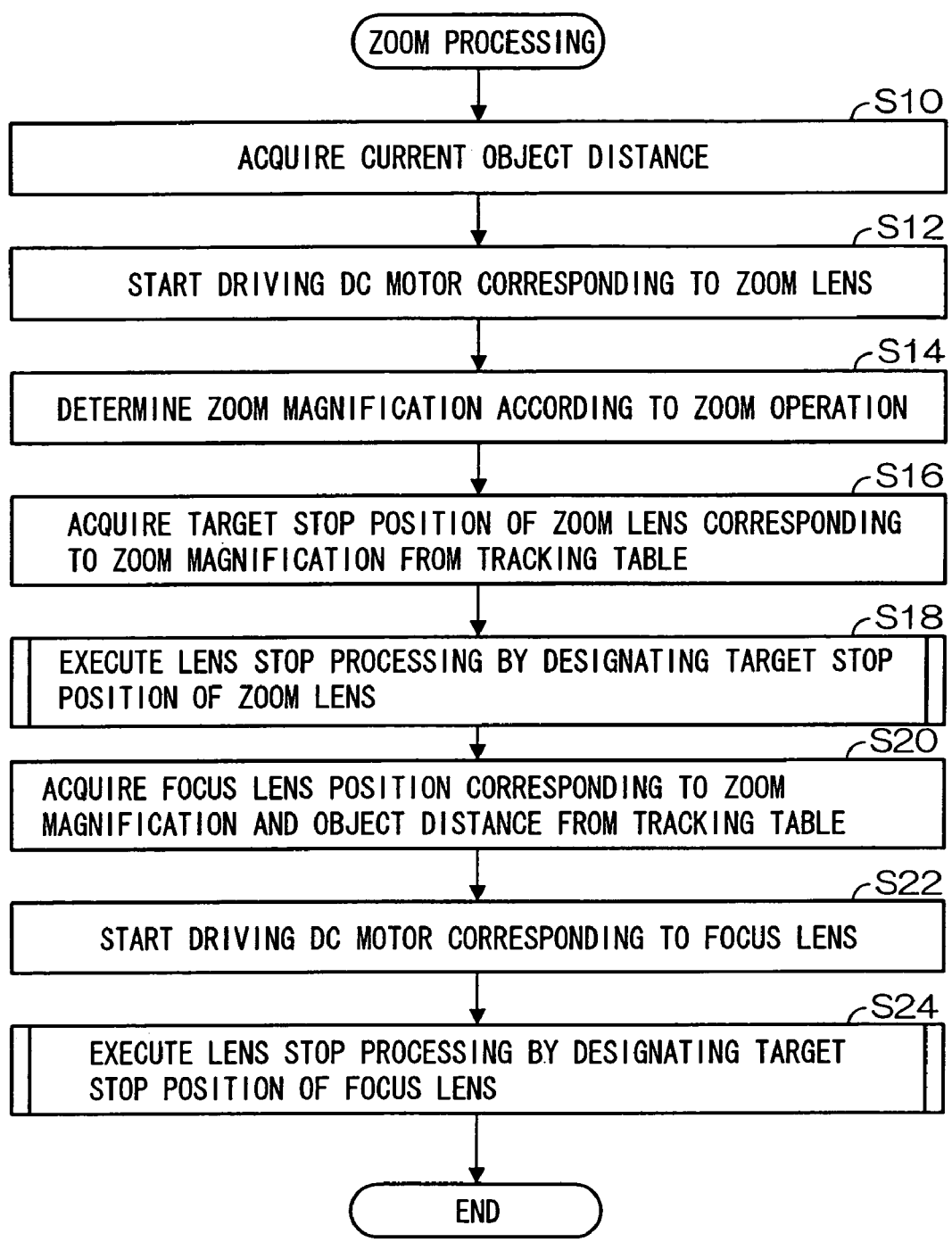
FIG. 4 is a flow chart showing a main routine of zoom processing according to this embodiment.
Figure 5:
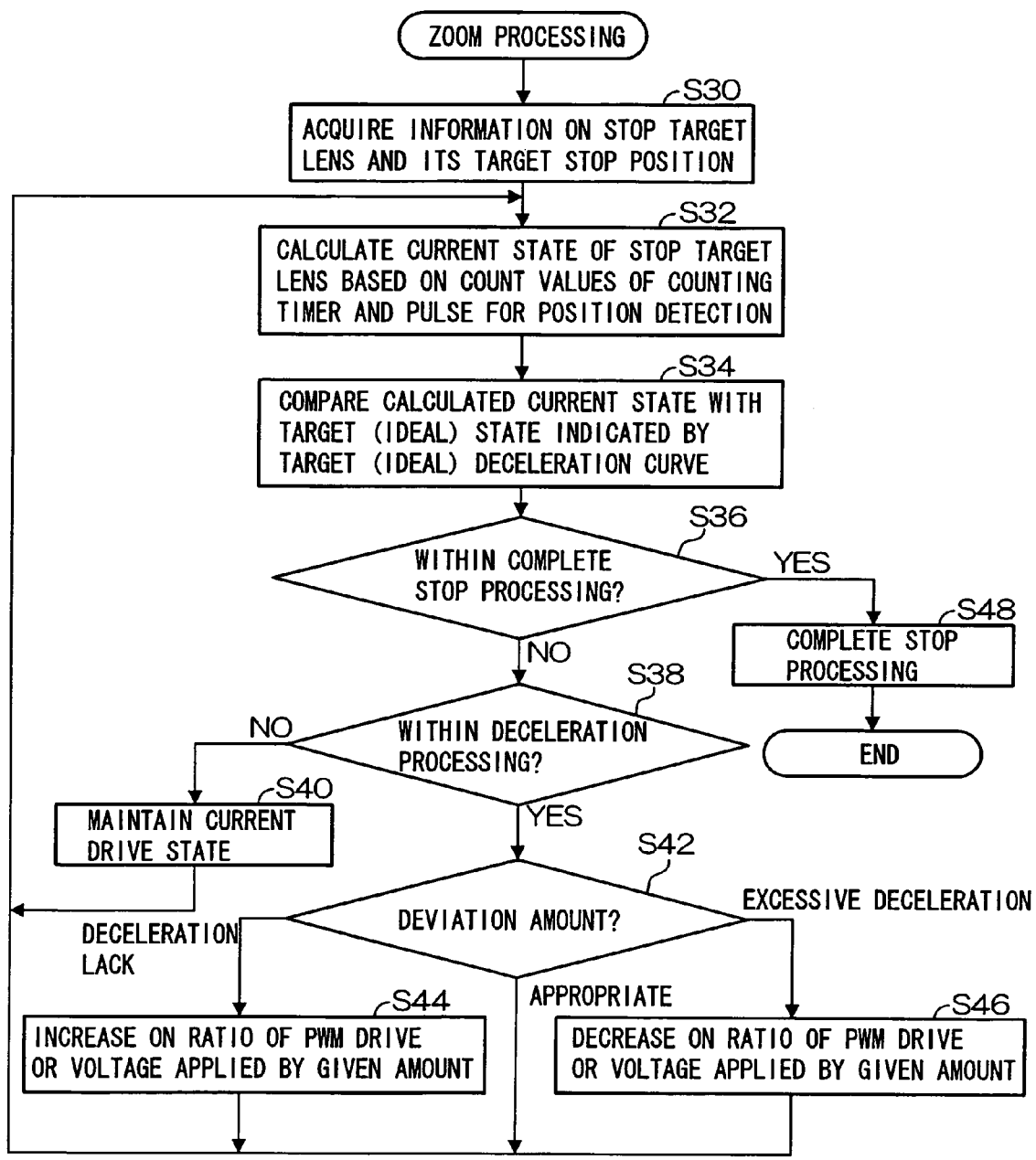
FIG. 5 is a flowchart showing lens stop processing in zoom processing according to this embodiment.
Figure 10A:
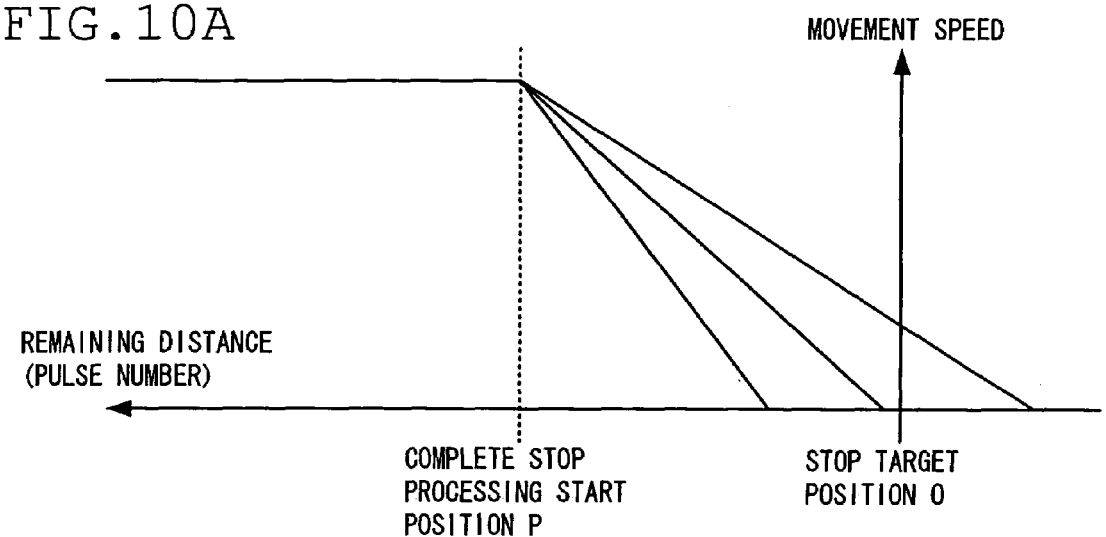
FIGS. 10A and 10B are conceptual diagrams for explaining stop position control technology of a DC motor according to a related art.
Figure 10B:
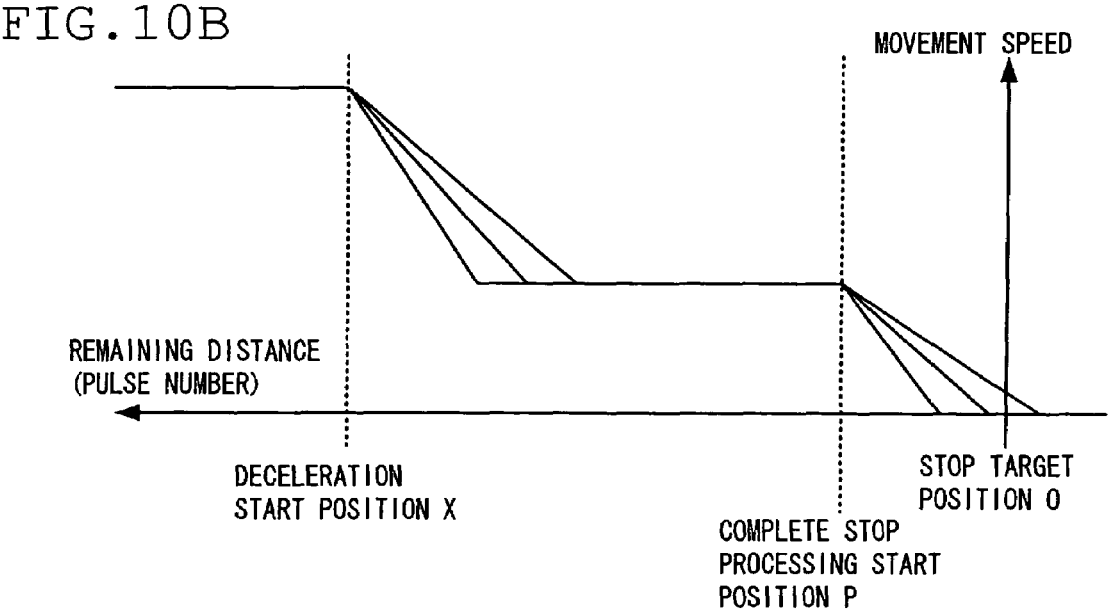

Next, operation of the foregoing embodiment will be described. Here, FIGS. 4 and 5 are flowcharts for explaining operation of the digital camera 1. FIG. 4 is a flowchart showing a main routine of zoom processing. FIG. 5 is a flowchart showing lens stop processing in the zoom processing.

In the zoom processing, first, a current object distance is acquired (Step S10), and driving the DC motor corresponding to the zoom lens is started (Step S12). Next, a zoom magnification is determined according to zoom operation (Step S14) and a zoom lens position corresponding to the zoom magnification that is defined as a target stop position of the zoom lens is acquired from the tracking table 30-1 (Step S16). Next, the target stop position of the zoom lens is designated and the lens stop processing is executed (Step S18). Details of the lens stop processing will be described later.

Next, a focus lens position corresponding to the zoom magnification and the object distance that is defined as a target stop position of the focus lens (focus address) is acquired from the tracking table 30-1 (Step S20), and driving the DC motor corresponding to the focus lens is started (Step S22). Next, the target stop position of the focus lens is designated, and the lens stop processing is executed (Step S24).

Next, the foregoing lens stop processing will be described. In the lens stop processing, first, information on a stop target lens and the target stop position is acquired (S30). In this case, the stop target lens means the zoom lens or the focus lens. The target stop position thereof is obtained in the foregoing Step S18 or the foregoing Step S24.

Next, a current state (absolute position, elapsed time, and movement speed) of the stop target lens is calculated based on count values of a clocking timer and a pulse for position detection (lens position detection pulse information) (Step S32) Since the fact that an absolute position of the stop target lens is specified based on a sensor detecting a reference position of the stop target lens and a signal from a sensor detecting movement of the stop target lens or rotation of the DC motor (lens position detection pulse information) and the technology for calculating elapsed time, movement speed of the stop target lens and the like by using a count value of the clocking timer are well known, and thus, details thereof will be omitted.

Next, a target (ideal) state indicated by the target (ideal) deceleration curve and the calculated current state are compared (Step S34). Here, examples of the target (ideal) deceleration curve are shown in FIGS. 6A to 6C and FIG. 7. In the target (ideal) deceleration curves shown in FIGS. 6A to 6C, the horizontal axis represents a remaining distance (remaining pulse number) from the stop target position O, and the vertical axis represents movement speed of the stop target lens. In the target (ideal) deceleration curves, a deceleration start position X for starting deceleration of the stop target lens, a complete stop processing start position P for starting complete stop processing by braking the stop target lens, and movement speed of the stop target lens in the course thereof are specified.

In the target (ideal) deceleration curve shown in FIG. 6A, the speed is decreased at a constant acceleration from the deceleration start position X to the target stop position O, and the stop target lens can be stopped more speedy and more precisely with less vibration and noise. In the target (ideal) deceleration curve shown in FIG. 6B, in the initial stage of deceleration start, the stop target lens is braked and the speed is immediately decelerated at the maximum acceleration, the state thereof is detected and then the speed is decelerated with a constant acceleration from such a state to the target stop position. Therefore, the stop target lens can be stopped speedier while the precision is maintained. In the target (ideal) deceleration curve shown in FIG. 6C, the acceleration in the initial stage of deceleration is moderately changed so that vibration and noise can be further inhibited.

Further, in the target (ideal) deceleration curve shown in FIG. 7, the horizontal axis represents a drive processing time T, and the vertical axis represents a remaining pulse number x to the stop target position. In this target (ideal) deceleration curve, a deceleration processing start pulse number indicating time to start deceleration of the stop target lens is specified.

As above, the target (ideal) deceleration curve can be specified by the relation between the remaining distance (remaining pulse number) in relation to the target stop position O and the elapsed time, can be specified by the relation between the remaining distance (remaining pulse number) in relation to the target stop position and the movement speed, or can be specified by other methods. Further, the shape of the target (ideal) deceleration curve can be changed according to the purpose such as giving priority to speed, precision, or smoothness. Otherwise, the shape of the target (ideal) deceleration curve can be selected by a user from a plurality of choices. Further, specific values indicated by the target (ideal) deceleration curve can be calculated by a calculation formula corresponding to the shape of the curve in each case, or these specific values can be stored in the table in advance.

That is, when the stop target lens is located still far from the stop target position, there is no risk that the stop target lens is not able to be stopped at the stop target position even if the movement speed is relatively fast. In this case, if the movement speed is excessively slow, the elapsed time to the stop target position becomes long. Meanwhile, when the stop target lens is located more close to the stop target position, the stop target lens is not able to be stopped at the stop target position unless the movement speed is slowed. Therefore, at least just before the stop target lens reaches the stop target position, stop processing is performed in accordance with the gradual deceleration curve in which as the stop target lens gradually approaches the stop target position, the movement speed is gradually slowed. Thereby, elapsed time to stop the stop target lens can be shortened, and precision of the stop position can be improved.

Further, in the whole course from start to completion of the movement stop processing of the stop target lens, the stop processing is performed in accordance with the gradual deceleration curve in which the acceleration in decelerating the movement speed of the stop target lens is not excessively high. Thereby, smooth stop processing can be performed so that vibration and noise in deceleration are not large.

After comparison between the target (ideal) state indicated by the target (ideal) deceleration curve and the calculated current state in Step S34, whether or not the stop target lens is in the range of complete stop processing (between P and O) is judged (Step S36). Here, when the stop target lens is not in the range of complete stop processing, that is when the stop target lens has not reached the complete stop processing start position P yet, whether or not the stop target lens is in the range of deceleration processing (between X and P) is judged (Step S38). Then, when the stop target lens is not in the range of complete stop processing or in the range of deceleration processing, the stop target lens is judged not to have reached the deceleration start position X, and the current drive state is maintained (Step S40). Then, the flow is returned to Step S32, and the foregoing processing steps are repeated.

When the stop target lens is not in the range of complete stop processing but is in the range of deceleration processing, the stop target lens is judged to have reached the deceleration start position X. Then, deviance of the current state from the deceleration curve is verified, and whether or not deceleration is lacked, whether or not deceleration is excessive, and whether or not deceleration is appropriate are judged (Step S42). Here, when the deviation shows deceleration lack, a command is sent to the motor driver 14-1 to increase the ON ratio of PWM drive or the voltage applied by a given amount (Step S44). Otherwise, when the deviation shows excessive deceleration, a command is sent to the motor driver 14-1 to decrease the ON ratio of PWM drive or the voltage applied by a given amount.

When control is made to approximate the current state to the target (ideal) deceleration curve in the case that the foregoing deceleration lack or the foregoing excessive deceleration is detected, adjustment may be made only by the ON ratio of PWM drive or only by the voltage applied, or by the both. Further, in the initial stage of deceleration, adjustment may be made mainly by the ON ratio of PWM drive, on the other hand, in the final stage of deceleration, adjustment may be made mainly by the voltage applied. Further, deceleration may be adjusted by using the output ON/OFF control line instead of the serial communication control line.

For example, when the target (ideal) deceleration curve shown in FIG. 7 is used, in the case that the deviation after start of the deceleration processing is appropriate, control as shown in FIG. 8 may be made according to the case of direction A or direction B. In FIG. 8, intermittent stop processing time represents OFF time in PWM drive, and intermittent drive processing time represents ON time in PWM drive. Further, a drive voltage corresponds to the foregoing voltage applied.

Meanwhile, when the deviation is appropriate or when the foregoing control is finished, the flow is returned to Step S32, and the foregoing processing steps are repeated until the stop target lens enters in the range of complete stop processing. Then, when the stop target lens enters in the range of complete stop processing, for example, when the stop target lens reaches the complete stop processing start position P after deceleration, command is sent to the motor driver 14-1 to brake the DC motor, and the complete stop processing is executed (Step S48). In this embodiment, output from the motor driver 14-1 is controlled in the OFF (impedance) state by using the output ON/OFF control line. Here, deceleration in the OFF (high impedance) state is deceleration more moderate than deceleration at "L" level. Therefore, it is possible that by setting the output ON/OFF control line to "L" level (or by other added control line), both the motor+side output and the motor−side output from the motor driver 14-1 are set to "L" level. In this case, when the DC motor is completely stopped, by setting the ON/OFF control line to "L" level instead of the serial communication control line, the communication load may be decreased. Then, when the complete stop processing is completed and the DC motor is stopped, the foregoing processing is finished.

Here, FIG. 9A shows an example of change of the voltage applied to the DC motor by the control method according to this embodiment. FIG. 9B is a conceptual diagram showing an example of lens position detection pulse from the lens unit 11. FIG. 9A shows a case where adjustment is made by both the ON ratio of PWM drive and the voltage applied. In this case, normal drive is made by supplying a given voltage applied to the deceleration start position X. When the stop target lens reaches the deceleration start position X, the ON ratio of PWM drive is gradually reduced, and the voltage applied is gradually reduced. When the stop target lens reaches the complete stop processing start position P, the stop target lens is completely stopped by setting the voltage applied to "0." Further whether the stop target lens reaches the deceleration start position X or the complete stop processing start position P may be found by calculation based on the count value of pulse for position detection (lens position detection pulse information) shown in FIG. 9B and the counting timer as described above.

In this regard, the movement control program for moving a given mechanism section, which is an embodiment of the present invention, is stored in a memory (for example, a ROM, etc.) of the apparatus (for example, a camera apparatus) as the computer program product. However, in the case of producing, marketing, etc., the movement control program recorded on a recording medium, the program should also be included in the scope of protection. In that case, a recording medium, on which the movement control program is recorded, should be protected.

While the present invention has been described with reference to the preferred embodiments, it is intended that the invention be not limited by any of the details of the description therein but includes all the embodiments which fall within the scope of the appended claims.

What is claimed is:
1. A camera apparatus comprising:
a lens unit which includes a lens and a DC motor that moves the lens;

a motor driver which controls electrical power applied to a coil of the DC motor by simultaneously performing PWM control and voltage control;

a definition section which defines, when moving the lens, in what relations an ON ratio in the PWM control and a voltage applied to the coil in the voltage control should be decreased as the lens approaches a stop target position; and a control section which, when moving the lens to a position corresponding to a zoom magnification or a focal length, sequentially specifies a current lens position based on a position detection signal outputted from the lens unit, and which simultaneously decreases both the ON ratio in the PWM control and the voltage applied to the coil in the voltage control in accordance with the sequentially specified lens position and definition contents defined by the definition section.

2. The camera apparatus according to claim 1, wherein:

a command that specifies the ON ratio in the PWM control and the voltage applied to the coil in the voltage control is inputted to the motor driver, and the motor driver controls the electrical power applied to the coil of the DC motor in accordance with the command; and the control section controls contents of the command outputted during movement of the lens, and an output timing.

3. The camera apparatus according to claim 2, further comprising a communication line which transmits given data from the control section to the motor driver by serial transfer; and wherein the control section transmits the command to the motor driver by utilizing the communication line.

4. The camera apparatus according to claim 1, wherein the definition section defines to adjust lens speed substantially with the ON ratio in the PWM control at initial stages of deceleration, and to adjust the lens speed substantially with the voltage applied to the coil in the voltage control at terminal stages of the deceleration.

5. The camera apparatus according to claim 1, wherein the definition section defines a relation between distance and speed or a relation between distance and time by a deceleration curve so that movement speed of the lens is gradually slowed as the lens approaches the stop target position, and wherein the definition section defines to decrease the ON ratio in the PWM control and the voltage applied to the coil in the voltage control by a first amount at a next stage when a current state of the lens is a deceleration state as indicated by the deceleration curve.

6. The camera apparatus according to claim 5, wherein the definition section defines to decrease the ON ratio in the PWM control and the voltage applied to the coil in the voltage control by an amount smaller than the first amount at the next stage when the current state of the lens is in an excessive deceleration state compared to the deceleration curve, and the definition section defines to decrease the ON ratio in the PWM control and the voltage applied to the coil in the voltage control by an amount larger than the first amount at the next stage when the current state of the lens is in a deceleration lack state compared to the deceleration curve.

7. An electronic apparatus comprising:

a mechanism unit which includes a mechanism section and a DC motor that moves the mechanism section;

a motor driver which controls electrical power applied to a coil of the DC motor by simultaneously performing PWM control and voltage control;

a definition section which defines, when moving the mechanism section, in what relations an ON ratio in the PWM control and a voltage applied to the coil in the voltage control should be decreased as the mechanism section approaches a stop target position; and a control section which, when moving the mechanism section to a position corresponding to a zoom magnification or a focal length, sequentially specifies a current mechanism section position based on a position detection signal outputted from the mechanism unit, and which simultaneously decreases both the ON ratio in the PWM control and the voltage applied to the coil in the voltage control in accordance with the sequentially specified mechanism section position and definition contents defined by the definition section.

8. The camera apparatus according to claim 2, wherein the control section outputs the command to move the lens at a constant speed until the lens reaches a first distance in relation to the stop target position, and outputs the command to gradually decelerate the movement speed of the lens from after the lens reaches the first distance to until the lens reaches a second distance.

9. The camera apparatus according to claim 8, wherein the control section outputs the command to stop rotation of the DC motor when the lens reaches the second distance in relation to the stop target position.

10. The camera apparatus according to claim 8, further comprising:

a communication line which transmits given data from the control section to the motor driver; and a control line for directly controlling by the control section a drive signal outputted from the motor driver, wherein the control section controls the motor driver by transmitting the command using the communication line until the lens reaches the second distance in relation to the stop target position, and directly stops output of the motor driver by utilizing the control line after the lens reaches the second distance in relation to the stop target position.

* * * * *